United States Patent [19]

Epperly et al.

[11] Patent Number: 4,822,577

[45] Date of Patent: Apr. 18, 1989

[54] METHOD FOR THE REDUCTION OF SULFUR TRIOXIDE IN AN EFFLUENT

[75] Inventors: William R. Epperly, New Canaan; James C. Sullivan, Norwalk; Barry N. Sprague, West Haven, all of Conn.

[73] Assignee: Fuel Tech, Inc., Stamford, Conn.

[21] Appl. No.: 219,297

[22] Filed: Jul. 14, 1988

[51] Int. Cl.$^4$ .............................................. C01B 17/00
[52] U.S. Cl. ...................................... 423/243; 423/242
[58] Field of Search ............... 423/242 R, 243, 244 R, 423/244 A

[56] References Cited

U.S. PATENT DOCUMENTS 3,563,697  2/1971  De Castro ........................... 423/243
4,626,418  12/1986  College et al. ...................... 423/243
4,743,436  5/1988  Lyon ................................... 423/235

FOREIGN PATENT DOCUMENTS 3316299  11/1984  Fed. Rep. of Germany .
3330843  3/1985  Fed. Rep. of Germany .

*Primary Examiner*—Gregory A. Heller
*Attorney, Agent, or Firm*—St. Onge Steward Johnston & Reens

[57] ABSTRACT

A method is presented for the selective gas-phase reduction of sulfur trioxide in the effluent from the combustion of a carbonaceous fuel, the method comprising introducing a treatment agent comprising hydrogen peroxide or an oxygenated hydrocarbon having at least two carbon atoms into the effluent at an effluent temperature of no greater than about 1450° F.

15 Claims, No Drawings

METHOD FOR THE REDUCTION OF SULFUR TRIOXIDE IN AN EFFLUENT

DESCRIPTION

1. Technical Field

The present invention relates to a method for reducing the concentration of sulfur trioxide ($SO_3$) in the effluent from the combustion of a carbonaceous fuel, the method comprising introducing a treatment agent comprising hydrogen peroxide or an oxygenated hydrocarbon having at least two carbon atoms into the effluent at an effluent temperature of no greater than about 1450° F.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of pollutants such as $SO_3$, the temperatures being so high that oxidation of sulfur dioxide ($SO_2$) occurs wherein sulfur dioxide and atomic oxygen (O) combine to form sulfur trioxide. This effect is amplified when high sulfur fuels are used. Additionally, sulfur trioxide can form at lower temperatures by the catalytic reaction of sulfur dioxide with molecular oxygen ($O_2$) brought about by catalytic metals such as vanadium oxide and iron oxides which can be in the boiler interior at lower temperatures. Sulfur trioxide, therefore, can be formed even in circulating fluidized bed boilers which operate at temperatures which typically range from 1300° F. to 1600° F.

Sulfur oxides, especially $SO_3$, are troublesome pollutants which are found in the combustion effluent streams of large utility boilers when fired as described above. Sulfur trioxide can combine with ammonia ($NH_3$) in the effluent stream (such as ammonia present as a by-product generated in a nitrogen oxides reducing process utilizing urea or the like) to form ammonium bisulfate ($NH_4HSO_4$) which can form undesirable deposits on the walls and heat transfer surfaces, particularly the air heater, of the boiler.

Unfortunately, the temperatures within a utility boiler render most common methods of reducing $SO_3$ concentrations, such as effluent scrubbing or catalyst grids, uneconomical, infeasible, or both.

2. Background Art

Lyon, in U.S. Pat. No. 4,743,436, attempts to reduce the amount of $SO_3$ in a combustion effluent by the introduction of methanol or formaldehyde under carefully controlled conditions including the presence of ammonia or ammonia precursors in the effluent, the presence of NO in the effluent, and a specific, limited ratio of introduction of the methanol or formaldehyde to the combined amount of $SO_3$ and NO in the effluent (0.8 to 2.0).

In U.S. Pat. No. 4,626,418 to College et al., sulfur dioxide is removed from a gaseous mixture by contacting the mixture with a mixture of sugar and an alkaline earth metal compound selected from the group consisting of calcium and magnesium carbonates, oxides and hydroxides. Similarly, German Pat. No. 3,330,843 discloses the reduction of sulfur dioxide by first treating the fuel with an additive comprising calcium carbonate and graphite and residual products from the sugar industry ("molasses and/or solids from beet cleaning and/or carbonaceous sludge from sugar production") and then treating the effluent with the same additive.

What is desired, though, is a method for reducing the sulfur trioxide content of an effluent from the combustion of a carbonaceous fuel which does not rely for its effectiveness on the presence of ammonia, ammonia precursors or NO, and which utilizes a treatment agent which can be introduced over a broad range independent of the amount of NO in the effluent (if any is present in the effluent at all). Moreover, because of the flammability and toxicity of methanol, a method for the reduction of sulfur trioxide in an effluent which utilizes a treatment agent of lower flammability and/or toxicity than methanol is also highly desired.

DISCLOSURE OF INVENTION

The present invention relates to a method for the selective gas-phase reduction of sulfur trioxide in the effluent from the combustion of a carbonaceous fuel, the method comprising introducing a treatment agent comprising hydrogen peroxide or an oxygenated hydrocarbon having at least two carbon atoms into the effluent at an effluent temperature of no greater than about 1450° F.

The preferred oxygenated hydrocarbons suitable for use in this invention are oxygenated hydrocarbons having at least two carbons such as alcohols, sugars, lignin derivatives, carboxylic acids, ethers, esters, peroxides, ketones, aldehydes, and mixtures thereof. Ethylene glycol, molasses, glycerin, tetrahydrofuran, acetone, sucrose, ammonium acetate and citric acid, and mixtures thereof are preferred oxygenated hydrocarbons for this purpose, with ethylene glycol, molasses, sucrose and glycerin being most preferred. Mixtures of polyols, such as those mixtures of low molecular weight polyols known as hydrogenated starch hydrosylates, can also be advantageously employed.

As used herein, the term "oxygenated hydrocarbon" refers to substituted and unsubstituted, straight or branch-chain aliphatic and cyclic, heterocyclic and aromatic hydrocarbons having at least one oxygen either in or bonded directly to the primary hydrocarbon chain or in or bonded directly to a substituent group, and mixtures thereof. Typical substituent groups useful herein include carboxylic acid groups (—COOH), peroxide groups (—O—O—), carbonyl groups (=C=O) and hydroxy groups (—OH). The term "sugar" refers to a number of useful saccharide materials which are capable of decreasing the $SO_3$ or $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, keto-hexoses like fructose and sorbose, disaccharides like lactose and maltose, non-reducing disaccharides like sucrose and other polysaccharides such as dextrin and raffinose, mixtures of saccharides such as corn syrup, sugar byproducts such as molasses, hydrolyzed starches which contain as their constituents oligosaccharides, and water dispersible polysaccharides.

Conditions under which the introduction of hydrogen peroxide or an oxygenated hydrocarbon is effective at reducing pollutants such as $SO_3$ in the effluent from the combustion of a carbonaceous fuel include the temperature of the effluent at the point of introduction, which is preferably no greater than than about 1450° F., more preferably between about 1100° F. and about 1350° F. It is surprising in view of the state of the art that these materials have independent sulfur trioxide reducing potential and that they may be used as principal $SO_3$ reducing agents.

It is an advantageous aspect of this invention that the concentration of sulfur trioxide in the effluent can be reduced significantly at such temperatures, which are below the effective operating temperatures of most prior art pollutant-reducing compositions and/or processes. The lower limit of effluent temperature at which the present invention is effective in reducing the concentration of sulfur trioxide is considered to be about 1000° F., although $SO_3$ reductions at even lower temperatures is within the contemplation of the inventors.

The availability of a process for reducing the concentration of pollutants in an effluent which is at temperatures below about 1450° F., especially below about 1350° F., is desirable because access to the effluent stream of a large industrial boiler at a location where the temperature is in the 1450° F. to 2000° F. range is not always possible without major redesign of the boiler because of exterior water jacketting and interior water tubes. To be practical for many situations, therefore, a reducing system must either be effective in the extremely high temperature flame area of the boiler or be effective in the relatively low temperature downstream or exhaust area of the boiler. This invention provides the latter in an economical and effective process for reducing the sulfur trioxide concentration in the effluent from the combustion of a carbonaceous fuel at such low temperatures.

For the purposes of this description, all temperatures herein are measured using an unshielded K-type thermocouple. Unless otherwise indicated, all parts and percentages are based on the weight of the composition at the particular point of reference.

It will be understood that the treatment agents of this invention are useful not only where substantial sulfur trioxide reductions are accomplished by directly applying the disclosed method as the principal or $SO_3$ reducing method, but can also be employed as a discrete step in combination with other chemical, catalytic or other procedures for reducing pollutant concentrations, including other pollutants such as nitrogen oxides ($NO_x$), while preferably controlling levels of residual pollutants such as ammonia and/or carbon monoxide (CO). Such a suitable "multi-step" process is disclosed in copending and commonly assigned U.S. patent application Ser. No. 022,716 entitled "Multi-Stage Process for Reducing the Concentration of Pollutants in an Effluent", filed in the names of Epperly, Peter-Hoblyn, Shulof, Jr. and Sullivan on Mar. 6, 1987, now U.S. Pat. No. 4,777,024, the disclosure of which is incorporated herein by reference.

Furthermore, the process of this invention can also be used in such a way as to reduce the levels of other pollutants such as CO by introducing the treatment agent so as to make use of the treatment agent's sulfur trioxide reduction versus effluent temperature curve in a manner analagous to that taught by copending and commonly assigned U.S. patent application Ser. No. 050,198 entitled "Process for Nitrogen Oxides Reduction and Minimization of the Production of Other Pollutants", filed in the names of Epperly, O'Leary and Sullivan on May 14, 1987, now U.S. Pat. No. 4,780,289, the disclosure of which is incorporated herein by reference.

The hydrogen peroxide or oxygenated hydrocarbon treatment agent of this invention can be used alone in its pure form, in mixtures or dispersions, such as aqueous mixtures or dispersions or in solution, preferably aqueous solutions due to the economy of aqueous solutions, although there may be instances where other carriers or solvents may be advantageously used, either alone or in combination with water, as would be known to the skilled artisan. The level of the hydrogen peroxide or oxygenated hydrocarbon employed should be that level necessary to elicit reductions in the concentration of sulfur trioxide in the effluent. Advantageously, the hydrogen peroxide or oxygenated hydrocarbon is employed at weight ratio of hydrogen peroxide or oxygenated hydrocarbon to the baseline sulfur trioxide level (i.e., the measured level of sulfur trioxide prior to introduction of the treatment agent of the present invention) of about 1:5 to about 25:1. The weight ratio of hydrogen peroxide or oxygenated hydrocarbon to the baseline sulfur trioxide level is more preferably about 1:5 to about 10:1 and is most preferably about 3:1 to about 8:1. The exact amount of hydrogen peroxide or oxygenated hydrocarbon employed may vary depending upon the overall economics of the process and the temperature of the effluent when the hydrogen peroxide or oxygenated hydrocarbon is introduced. It has unexpectedly been found that even at the higher ratios, emissions of carbon monoxide do not exceed acceptable levels.

The treatment agent of the present invention can contain other components besides the hydrogen peroxide or oxygenated hydrocarbon such as surfactants, sequestering agents, viscosity/coking time modifiers, etc. to facilitate handling or introduction of the treatment agent and/or to achieve other objectives in the effluent, although in terms of the reduction of sulfur trioxide, the oxygenated hydrocarbon of this invention is all that is necessary. In other words, surprisingly, for effective sulfur trioxide reduction, the treatment agent of the present invention can consist essentially of an oxygenated hydrocarbon having at least two carbon atoms.

The effluent into which the oxygenated hydrocarbon treatment agent of this invention is introduced is generally oxygen-rich, meaning that there is an excess of oxygen in the effluent. Most often, the excess of oxygen is greater than about 1% by volume. Typically, the excess of oxygen is in the range of about 1% to about 10% by volume.

The hydrogen peroxide or oxygenated hydrocarbon treatment agent utilized according to this invention is preferably introduced by injection at a number of spaced positions from nozzles or other apparatus which are effective to uniformly distribute the treatment agent through the combustion effluent.

The hydrogen peroxide or oxygenated hydrocarbon treatment agents of this invention have been found to be able to also reduce the concentration of nitrogen oxides in an effluent, as disclosed in copending and commonly assigned U.S. patent application Ser. No. 022,799 entitled "Process for Reducing Nitrogen Oxides in an Effluent Using a Hydrocarbon or Hydrogen Peroxide", filed in the name of Sullivan on Mar. 6, 1987; and copending and commonly assigned U.S. patent application Ser. No. 155,864 entitled "Process for Nitrogen Oxides Reduction with Minimization of the Production of Other Pollutants", filed in the names of Epperly, O'Leary, Sullivan and Sprague on Feb. 29, 1988, the disclosures of which are incorporated herein by reference. By utilizing the method of the present invention in concert with the methods of these two applications, therefore, it is possible to simultaneously achieve substantial reductions in the effluent concentrations of both sulfur trioxide and nitrogen oxides.

The following examples further illustrate and explain the invention by detailing its operation, with resultant reductions in sulfur trioxide emissions.

EXAMPLE I

This example details the reduction of $SO_3$ in a combustion effluent by introduction of treatment agents of the present invention.

The burner used in the examples is a burner having an effluent flue conduit, known as a combustion tunnel, approximatley 209 inches in length and having an internal diameter of 8 inches and walls 2 inches thick. The burner has a flame area adjacent the effluent entry port and flue gas monitors adjacent the effluent exit port to measure the concentration of compositions such as sulfur trioxide, ammonia, carbon monoxide, nitrogen oxides, carbon dioxide, percent excess oxygen and other compounds of interest which may be present in the effluent. The effluent flue conduit additionally has thermocouple ports for temperature measurement at various locations. The temperature of the effluent into which the $SO_3$-reducing treatment agents are introduced is measured at the point of introduction utilizing a K-type thermocouple.

Atomizing injectors described in copending U.S. patent application Ser. No. 009,696 entitled "Process and Apparatus for Reducing the Concentration of Pollutants in an Effluent", filed in the name of Burton on Feb. 2, 1987, the disclosure of which is incorporated herein by reference, are positioned through ports in the effluent flue conduit in order to introduce and distribute the $SO_3$-reducing treatment agents into the effluent stream. The treatment agents are injected into the effluent at a rate of 310 gm/hr. The burner fuel is a Number 2 fuel oil, and the burner is fired at a rate of 7.4 lbs/hr to provide an effluent temperature at the location of introduction of the treatment agents of 1280° F.

A baseline sulfur trioxide concentration reading is taken prior to beginning each run to calculate the ratio of treatment agents injected to baseline sulfur trioxide level ("Ratio, gm/gm"), and a final sulfur trioxide reading is taken during and downstream from injection of the $SO_3$-reducing agents to calculate the reduction in the sulfur trioxide concentration The results are set out in Table 1:

TABLE 1

| Treatment Agent | $O_2$ (%) | $SO_3$ Baseline (ppm) | Ratio, gm/gm | $SO_3$ Final (ppm) | % Red. |
|---|---|---|---|---|---|
| Ethylene Glycol | 4.0 | 45 | 4.42 | 20.5 | 54.4 |
| Sucrose | 4.0 | 45 | 4.42 | 32 | 28.9 |
| Hydrogen Peroxide | 4.3 | 48 | 4.15 | 40 | 16.7 |
| Molasses and Ethylene Glycol | 4.0 | 48 | 4.15 | 38 | 20.8 |

TABLE 1-continued

| Treatment Agent | $O_2$ (%) | $SO_3$ Baseline (ppm) | Ratio, gm/gm | $SO_3$ Final (ppm) | % Red. |
|---|---|---|---|---|---|
| Tetrahydrofuran | 4.0 | 48 | 4.15 | 38 | 20.8 |
| Acetone | 4.0 | 48 | 4.15 | 36 | 25.0 |

The results of Example I clearly illustrate the ability of the treatment agents of the present invention to reduce the concentration of sulfur trioxide in the effluent from the combustion of a carbonaceous fuel.

EXAMPE II

This example also details the reduction of $SO_3$ in a combustion effluent using treatment agents of the present invention.

The procedure followed is that of Example I except that the effluent temperature is that indicated and the results are set out in Table 2:

TABLE 2

| Treatment Agent | $O_2$ (%) | Temp. (°F.) | $SO_3$ Baseline (ppm) | Ratio, gm/gm | $SO_3$ Final (ppm) | % Red. |
|---|---|---|---|---|---|---|
| Ethylene Glycol | 4.4 | 1280 | 45 | 4.66 | 25 | 45 |
| Sucrose | 4.4 | 1280 | 45 | 4.66 | 34 | 24.4 |
| Glycerin | 4.4 | 1290 | 45 | 4.66 | 27 | 40 |
| Ammonium Acetate | 4.0 | 1290 | 45 | 4.78 | 42 | 6.7 |
| Citric Acid | 3.9 | 1295 | 45 | 4.81 | 40 | 11.1 |

The results of Example II clearly provide further illustration of the ability of the treatment agents of the present invention to reduce the concentration of sulfur trioxide in the effluent from the combustion of a carbonaceous fuel.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A method for the selective reduction of sulfur trioxide in the effluent from the combustion of a carbonaceous fuel, the method comprising introducing a treatment agent comprising hydrogen peroxide or an oxygenated hydrocarbon having at least two carbon atoms into the effluent at an effluent temperature of between about 1000° F. and about 1450° F.

2. The method of claim 1 wherein said oxygenated hydrocarbon is selected from the group consisting of alcohols, sugars, lignin derivatives, carboxylic acids, peroxides, aldehydes, ethers, esters, ketones, and mixtures thereof.

3. The method of claim 2 wherein said oxygenated hydrocarbon is selected from the group consisting of ethylene glycol, molasses, glycerin, tetrahydrofuran, acetone, ammonium acetate, citric acid, sucrose, and mixtures thereof.

4. The method of claim 1 wherein the effluent temperature is between about 1100° F. and about 1350° F.

5. The method of claim 1 wherein the weight ratio of said oxygenated hydrocarbon to sulfur trioxide in the effluent is about 3:1 to about 8:1.

6. The method of claim 1 wherein said treatment agent comprises an aqueous dispersion.

7. The method of claim 6 wherein said oxygenated hydrocarbon is present in said dispersion in an amount of about 1% to about 25% by weight.

8. The method of claim 1 wherein the pollutant being reduced comprises both nitrogen oxides and sulfur trioxide.

9. A method for the reduction of nitrogen oxides while concommitantly reducing the concentration of sulfur trioxide in the effluent from the combustion of a carbonaceous fuel, the method comprising introducing into the effluent a treatment agent comprising hydrogen peroxide or an oxygenated hydrocarbon having at least two carbon atoms at an effluent temperature of between about 1000° F. and about 1450° F.

10. The method of claim 9 wherein said oxygenated hydrocarbon is selected from the group consisting of alcohols, sugars, lignin derivatives, carboxylic acids, peroxides, aldehydes, ethers, esters, ketones, and mixtures thereof.

11. The method of claim 10 wherein said oxygenated hydrocarbon is selected from the group consisting of ethylene glycol, molasses, glycerin, tetrahydrofuran, ammonium acetate, citric acid, acetone, sucrose, and mixtures thereof.

12. The method of claim 9 wherein the effluent temperature is between about 1100° F. and about 1300° F.

13. The method of claim 9 wherein the weight ratio of said oxygenated hydrocarbon to sulfur trioxide in the effluent is about 3:1 to about 8:1.

14. The method of claim 9 wherein said treatment agent comprises an aqueous dispersion.

15. The method of claim 14 wherein said oxygenated hydrocarbon is present in said dispersion in an amount of about 1% to about 25% by weight.

* * * * *